No. 870,155. PATENTED NOV. 5, 1907.
W. H. BEAN.
ELECTRIC POPCORN MACHINE.
APPLICATION FILED NOV. 26, 1906.
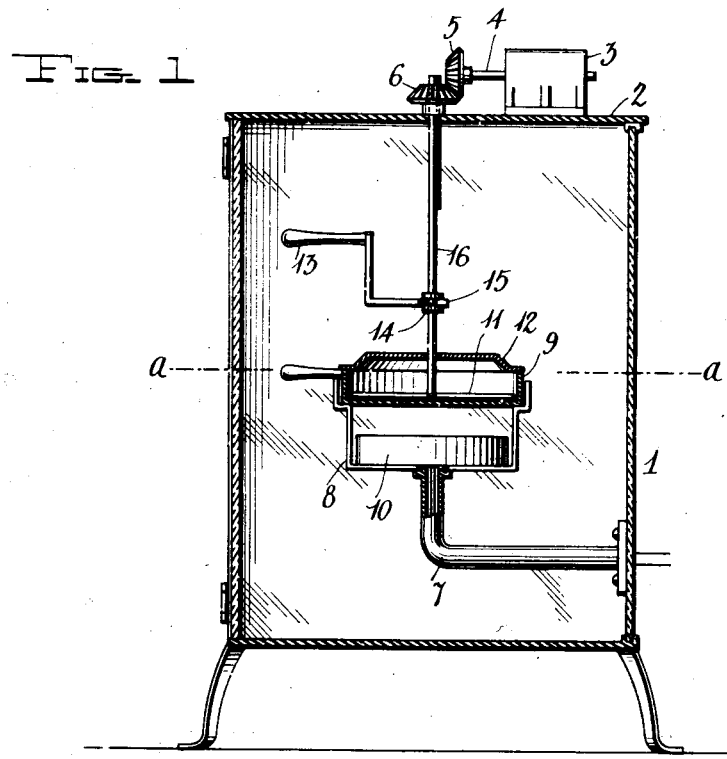
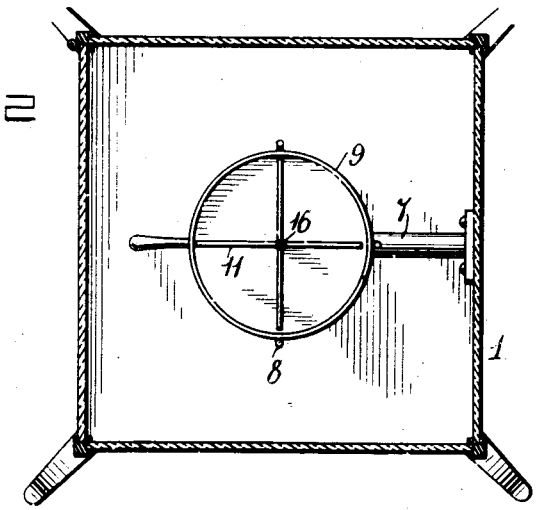
Witnesses
Inventor
W. H. Bean
by
Attorneys

UNITED STATES PATENT OFFICE.

WILLIAM HUGH BEAN, OF GADSDEN, ALABAMA.

ELECTRIC POPCORN-MACHINE

No. 870,155.  Specification of Letters Patent.  Patented Nov. 5, 1907.

Application filed November 26, 1906. Serial No. 345,259.

*To all whom it may concern:*

Be it known that I, WILLIAM HUGH BEAN, a citizen of the United States, residing at Gadsden, in the county of Etowah and State of Alabama, have invented certain new and useful Improvements in Electric Popcorn-Machines; and I do declare the following to be a full, clear, and exact description of the invention, such as will enable others skilled in the art to which it appertains to make and use the same.
My invention is an improved electric popcorn machine, and it consists in the construction, combination and arrangement of devices hereinafter described and claimed.

In the accompanying drawings,—Figure 1 is a vertical sectional view of an electric popcorn machine embodying my invention; and Fig. 2 is a transverse sectional view of the same, taken on the plane indicated by the line *a—a* of Fig. 1.

The casing 1 may be of any suitable size and construction, and is preferably provided with glazed sides and with a glazed door. The top 2 is removable and carries an electric motor, indicated at 3, and which has a driving shaft 4, provided with a miter gear 5. A vertical shaft 6 is journaled in a bearing in the center of the top at the lower portion thereof and is provided at its upper end with a spur gear 6, which meshes with the gear 5. In the said casing is a bracket 7, which is secured to one side thereof and which supports a rack 8. The upper end of the said rack is enlarged to receive and support a pan 9. In the lower portion of said rack is supported an electric heater 10, the feed wires of which extend through the bracket 7, which is hollow. At the lower end of the shaft 16 is a stirrer 11 to operate in the pan and the popcorn therein when the said shaft is driven by the motor. A cover 12 for the pan has a central opening, through which the said shaft 16 extends, so that said cover may be raised from or lowered on the pan. A lever 13 is attached to the shaft 16, the latter having an annular groove 14 and said lever having a bifurcated end 15 to engage said groove. Said lever may be employed to raise and lower said shaft and hence also the stirrer 11 to permit the pan to be put in place in or removed from the pan. The shaft 4 of the motor 3 is movable longitudinally to a slight extent to enable its gear 5 to clear the gear 6, when the latter is raised with and by its shaft 16.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention, as defined by the appended claims.

Having thus described my invention, what I claim as new, and desire to secure by Letters-Patent, is,—

1. In a machine of the class described, a casing, a hollow bracket therein attached to one side thereof, a rack on the upper end of said bracket, an electric heater in the lower portion of said rack and having feed wires extending through said hollow bracket, a pan in the upper portion of the rack and removable therefrom, a motor on the casing, a vertical shaft geared to said motor and having a stirrer to operate in the pan, means to raise and lower said shaft, and a cover for the pan, having an opening through which said shaft extends, and movable vertically on said shaft.

2. In a machine of the class described, a casing, a rack supported therein and having an enlarged upper portion, an electric heater in the lower portion of said rack, a pan in the enlarged upper portion of said rack and removable therefrom, a cover for the casing, removable therefrom, a motor on said cover, and a vertical shaft having a bearing in the cover, geared to said motor and having a stirrer at its lower end to operate in the pan.

In testimony whereof I have hereunto set my hand in presence of two subscribing witnesses.

WILLIAM HUGH BEAN.

Witnesses:
J. H. LESTER,
G. M. COLEMAN.